United States Patent
Buvril et al.

(10) Patent No.: US 9,546,718 B2
(45) Date of Patent: Jan. 17, 2017

(54) SYSTEM COMPRISING A ROLLER SCREW AND A ROLLER THRUST BEARING

(71) Applicant: Aktiebolaget SKF, Göteborg (SE)

(72) Inventors: Gerard Buvril, Bourget du Lac (FR); Christian Boch, Chambery (FR)

(73) Assignee: AKTIEBOLAGET SKF, Gothenburg (SE)

( * ) Notice: Subject to any disclaimer, the term of this patent is extended or adjusted under 35 U.S.C. 154(b) by 214 days.

(21) Appl. No.: 14/134,161

(22) Filed: Dec. 19, 2013

(65) Prior Publication Data
US 2014/0165754 A1 Jun. 19, 2014

(30) Foreign Application Priority Data
Dec. 19, 2012 (FR) ...................... 12 62283

(51) Int. Cl.
*F16H 25/22* (2006.01)
*F16H 25/24* (2006.01)
(Continued)

(52) U.S. Cl.
CPC .............. *F16H 25/24* (2013.01); *F16H 25/18* (2013.01); *F16H 25/20* (2013.01); *F16H 25/22* (2013.01);
(Continued)

(58) Field of Classification Search
CPC .. F16H 25/08; F16H 25/2006; F16H 25/2247; F16H 25/2266; F16H 25/2252; F16C 2322/39; F16C 2322/50; B66F 5/025; B66F 2700/05; B66F 7/025
(Continued)

(56) References Cited

U.S. PATENT DOCUMENTS 2,325,099 A 7/1943 Best
4,037,893 A * 7/1977 Perrin ................. F16H 25/2252
384/550
(Continued)

FOREIGN PATENT DOCUMENTS

DE 2112785 A1 11/1971
DE 4115758 A1 * 11/1992 .............. F16C 33/36
(Continued)

OTHER PUBLICATIONS

Database WPI Week 198218 Thomson Scientific, London, GB; AN 1982-C7269E XP002709910,—& SU 832 178 AI (VLADIMIR POLY) 23 mai 1981 (May 23, 1981) * abrege; figure 1 *.

*Primary Examiner* — David M Fenstermacher
*Assistant Examiner* — Joseph Brown
(74) *Attorney, Agent, or Firm* — Bryan Peckjian; SKF USA Inc. Patent Dept.

(57) ABSTRACT

The system comprises a roller screw mechanism 12 which is provided with a screw 16 which comprises at least a first outer threaded portion 18, a nut 20 and a plurality of rollers 24 which cooperate with the first outer portion 18 and an inner thread of the nut. The system further comprises a roller thrust bearing 14 which is mounted on a second outer portion 52 of the screw and which is provided with a bushing 50 and a plurality of rollers 56 which comprise flanks which cooperate with flanks of the second outer portion 52 of the screw and the bushing 50. The flanks of the screw, the bushing and the rollers are configured so that, during a rotation of the screw, the rollers 56 are fixed axially relative to the screw 16 and relative to the bushing 50.

5 Claims, 3 Drawing Sheets

(51) Int. Cl.
*F16H 25/18* (2006.01)
*F16H 25/20* (2006.01)

(52) U.S. Cl.
CPC ...... *F16H 25/2247* (2013.01); *F16H 25/2252* (2013.01); *Y10T 74/18576* (2015.01); *Y10T 74/19702* (2015.01)

(58) Field of Classification Search
USPC ............. 74/424.92, 413, 424.72, 424.81, 424.89, 74/424.6, 424.7; 310/12
See application file for complete search history.

(56) References Cited

U.S. PATENT DOCUMENTS

| | | | | |
|---|---|---|---|---|
| 4,375,770 A | * | 3/1983 | Druet | F16H 25/2025 74/424.92 |
| 4,749,169 A | * | 6/1988 | Pickles | B66F 3/12 254/122 |
| 4,865,162 A | * | 9/1989 | Morris | B60T 1/065 188/158 |
| 6,370,978 B1 | * | 4/2002 | Dietrich | F16H 25/2266 74/424.89 |
| 6,572,076 B1 | * | 6/2003 | Appleford | F16K 31/047 251/69 |
| 6,791,215 B2 | * | 9/2004 | Tesar | F16H 25/205 310/12.24 |
| 6,796,199 B2 | * | 9/2004 | Kurz | B23Q 5/402 74/424.71 |
| 7,044,017 B2 | * | 5/2006 | Cornelius | F16H 25/2252 74/424.81 |
| 7,834,494 B2 | * | 11/2010 | Blanding | B64C 13/00 310/112 |
| 2005/0160856 A1 | * | 7/2005 | Sugitani | F16H 25/2252 74/424.92 |

FOREIGN PATENT DOCUMENTS

| | | |
|---|---|---|
| FR | 1577532 A | 8/1969 |
| SU | 832178 A1 | 5/1981 |

* cited by examiner

SYSTEM COMPRISING A ROLLER SCREW AND A ROLLER THRUST BEARING

CROSS-REFERENCE TO RELATED APPLICATIONS

This application claims priority to French Patent Application No. 1262283 filed Dec. 19, 2012, the contents of which are hereby fully incorporated by reference.

FIELD OF THE INVENTION

The present invention relates to the field of systems comprising roller screw mechanisms which allow a rotation movement to be converted into a linear translation movement, and vice versa.

BACKGROUND OF THE INVENTION

Such a mechanism is provided with a screw which comprises an outer thread, a nut which is arranged around the screw and which comprises an inner thread, and a plurality of longitudinal rollers which engage with the outer and inner threads of the screw and the nut. Compared with a ball screw mechanism, a roller screw mechanism has the main advantage of having higher permissible load capacities.

A first type of roller screw mechanism provides rollers which have an outer thread which is in engagement with the outer and inner threads of the screw and the nut, and which roll in the nut around the screw in a constant axial position. Such a mechanism is referred to as a satellite roller screw.

A second type of mechanism comprises rollers which are non-threaded but which are provided with grooves inside which the outer thread of the screw and the inner thread of the nut are accommodated. During a rotation of the screw or the nut, the rollers move axially in the nut. After a complete revolution, each roller is returned to the initial position thereof by cams which are fixed to the ends of the nut. Such a mechanism is referred to as a screw with roller recirculation.

In order to rotatably guide the screw of a roller screw mechanism and to support the loads transmitted, there is generally mounted an end bearing on a smooth portion of the screw. This bearing must support relatively high loads. Consequently, the end bearing generally used comprises four oblique-contact ball bearings which are accommodated inside a casing and preloaded axially by a self-locking clamping nut.

This solution has in particular the disadvantages of having a large axial dimension and requiring a large number of assembly operations. Furthermore, the weight of such a bearing is relatively great.

An object of the present invention is to overcome these drawbacks.

SUMMARY OF THE INVENTION

More specifically, it is a particular object of the present invention to provide a system for converting a rotational movement into a linear translation movement which has a restricted axial dimension, is easy to assemble and has a limited weight.

In one embodiment, the system comprises a roller screw mechanism which is provided with a screw which comprises at least a first outer threaded portion, a nut which is arranged around and coaxially with the screw and a plurality of rollers which comprise flanks which cooperate with the first threaded outer portion of the screw and an inner thread of the nut. The system further comprises a roller thrust bearing which is mounted on a second outer portion of the screw and which is provided with a bushing which is arranged around and coaxially with the screw, and a plurality of rollers which are interposed between the screw and the bushing and which comprise flanks which cooperate with flanks of the second outer portion of the screw and the bushing. The flanks of the screw, the bushing and the rollers are configured so that, during a rotation of the screw, the rollers are fixed axially relative to the screw and relative to the bushing.

Alternatively, the second outer portion of the screw is threaded and the bushing comprises an inner thread. Each roller of the thrust bearing may comprise an outer thread which is in engagement with the flanks of the thread of the second outer portion and the flanks of the inner thread of the bushing.

Advantageously, the values of the helix angles of the thread of the second outer portion of the screw, the inner thread of the bushing and the threads of the rollers are identical to each other.

Preferably, the contact profiles of the roller thrust bearing are identical to the contact profiles of the roller screw mechanism.

In another embodiment, each roller of the roller thrust bearing comprises grooves inside which the flanks of the second outer portion of the screw and the flanks of the bushing are accommodated.

The values of the diameters of the first and second outer portions of the screw may be identical to each other.

In an embodiment, each roller of the mechanism comprises an outer thread which is in engagement with the first threaded outer portion of the screw and with the inner thread of the nut. Advantageously, the values of the helix angles of the threads of the rollers and the inner thread of the nut are identical to each other and different from the value of the helix angle of the thread of the first outer portion of the screw.

Alternatively, each roller of the mechanism comprises grooves inside which the inner thread of the nut and the thread of the first outer portion of the screw are accommodated.

The invention also relates to an actuation jack, which comprises a rotary driving means and a system as defined above, the screw of the system being coupled to the driving means.

BRIEF DESCRIPTION OF THE DRAWINGS

The present invention will be better understood from a reading of the detailed description of an embodiment given by way of non-limiting example and illustrated by the appended drawings, in which.

DETAILED DESCRIPTION OF THE INVENTION

Figure 1:
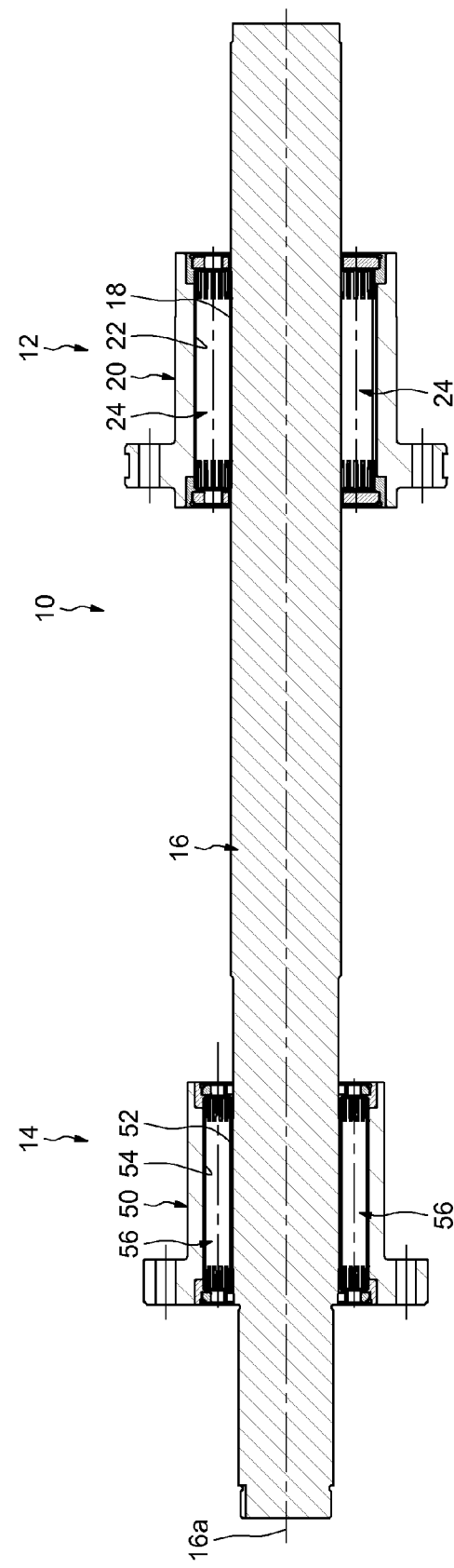
FIG. 1 is a sectioned view of a system according to an embodiment of the invention.

In FIG. 1, a system which is generally designated 10 comprises a roller screw mechanism 12 and a roller thrust bearing 14. The mechanism 12 comprises a screw 16 which has an axis 16a and which is provided with a first outer threaded portion 18, a nut 20 which is mounted coaxially around the screw 16 and which is provided with an inner thread 22 whose inner diameter is greater than the outer diameter of the outer threaded portion 18, and a plurality of longitudinal rollers 24 which are arranged radially between the screw and the nut. The screw 16 extends longitudinally through a cylindrical bore of the nut 20 on which the inner thread 22 is formed.

Figure 2:
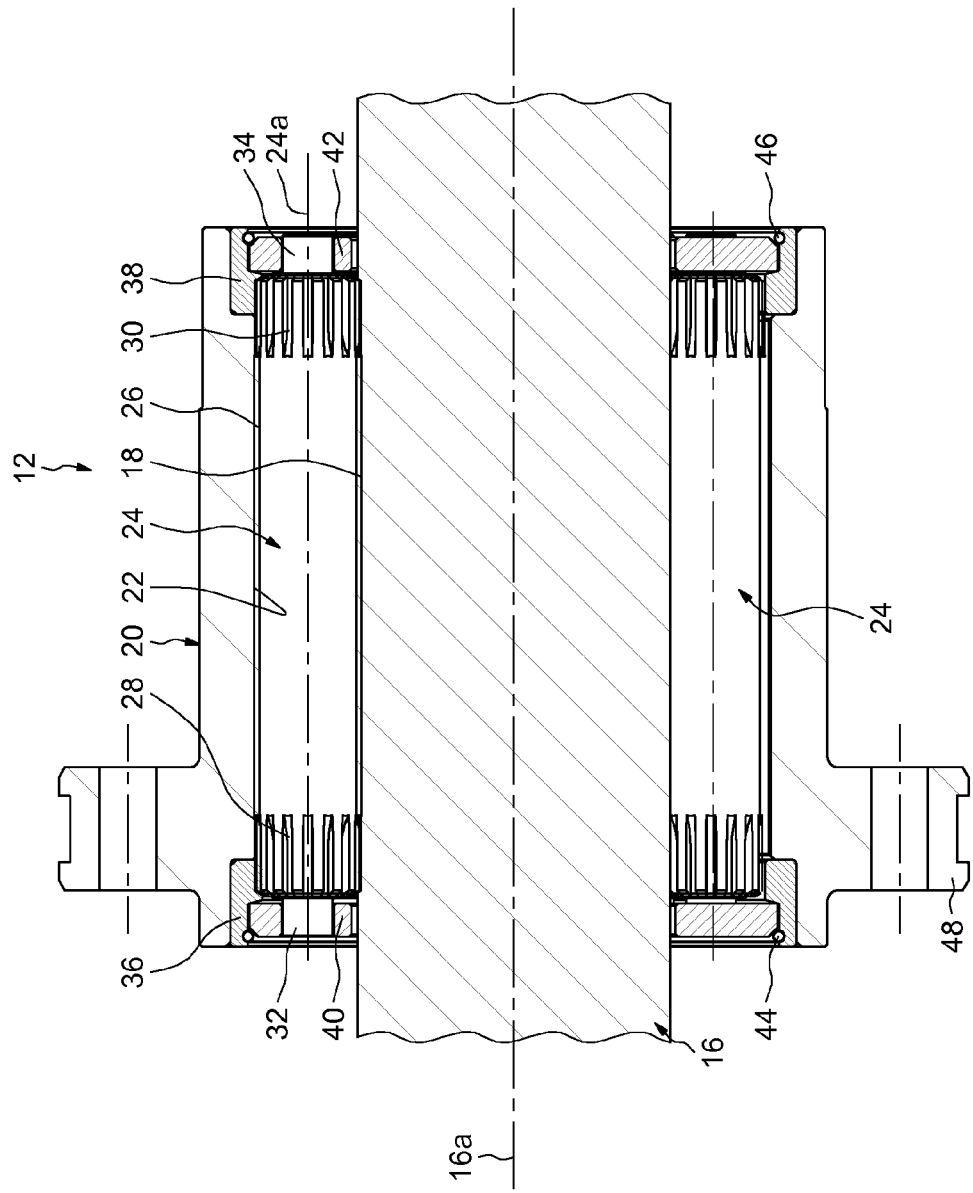
FIGS. 2 and 3 are detailed views of FIG. 1.

As illustrated more clearly in FIG. 2, the rollers 24 are identical to each other and distributed in a regular manner around the screw 16. Each roller 24 extends along an axis 24a which is coaxial with the axis 16a of the screw and which comprises an outer thread 26 which is in engagement with the threaded portion 18 of the screw and the thread 22 of the nut. The threaded portion 18 of the screw, the thread 22 of the nut and the thread 26 of the rollers each comprise an inlet. The thread 26 of each roller is extended axially at each end by a tooth arrangement 28, 30 which is itself extended axially by a cylindrical journal 32, 34 which extends axially outwards.

The mechanism 10 also comprises two annular gear wheels 36, 38 which are fixed in a non-threaded portion of the bore of the nut 20 and which each comprise internally a tooth arrangement (not designated) which is in engagement with the tooth arrangement 28, 30 of the rollers, respectively, for their synchronization. The mechanism 10 also comprises two annular rings 40, 42 which are each mounted radially between the threaded portion 18 of the screw and the associated gear wheel 36, 38 and which comprise a plurality of cylindrical through-recesses (not designated) which are distributed in a regular manner in the circumferential direction and inside which the journals 32, 34 of the rollers are accommodated. The rings 40, 42 allow the rollers 24 to be carried and allow their regular circumferential spacing to be maintained. The mechanism 10 further comprises snap rings 44, 46 which are each mounted in a groove which is provided in the bore of the associated gear wheel 36, 38 and which are provided to axially retain the corresponding ring 40, 42.

The value of the helix angle of the threads 26 of the rollers is identical to the value of the helix angle of the thread 22 of the nut and different from the value of the helix angle of the first threaded portion 18 of the screw so that, when the screw 16 rotates relative to the nut 20, the rollers 24 rotate about themselves and roll around the screw 16 without moving axially inside the nut 20. The rollers 24 are guided in rotation parallel with the axis 16a of the screw by the tooth arrangements of the gear wheels 36, 38. A rotation movement of the screw 16 is converted into a linear translation movement of the nut 20 by the rollers 24 which rotate about themselves. The nut 20 comprises a fixing collar 48 which is provided on the outer surface thereof and which comprises a plurality of through-holes in order to be able, for example, to fix the nut to a sheath which supports a load which is intended to be moved.

With reference again to FIG. 1, the roller thrust bearing 14 of the system allows the rotation movement of the screw 16 to be guided and allows the loads transmitted to the system to be supported, in particular high loads, in a reduced space. The thrust bearing 14 has a structure similar to that of the mechanism 12.

The thrust bearing 14 is mounted on the screw 16 with axial spacing from the mechanism 12. The screw 16 forms a shaft common to the thrust bearing 14 and the mechanism 12. The thrust bearing 14 comprises a bushing 50 which is mounted coaxially around a second outer threaded portion 52 of the screw and which is provided with an inner thread 54 whose inner diameter is greater than the outer diameter of the outer threaded portion. The values of the diameters of the first and second threaded portions 18, 52 are identical. The thrust bearing 14 also comprises a plurality of longitudinal rollers 56 which are arranged radially between the screw and the bushing. The screw 16 extends longitudinally through a cylindrical bore of the bushing 50 on which the inner thread 54 is formed.

Figure 3:
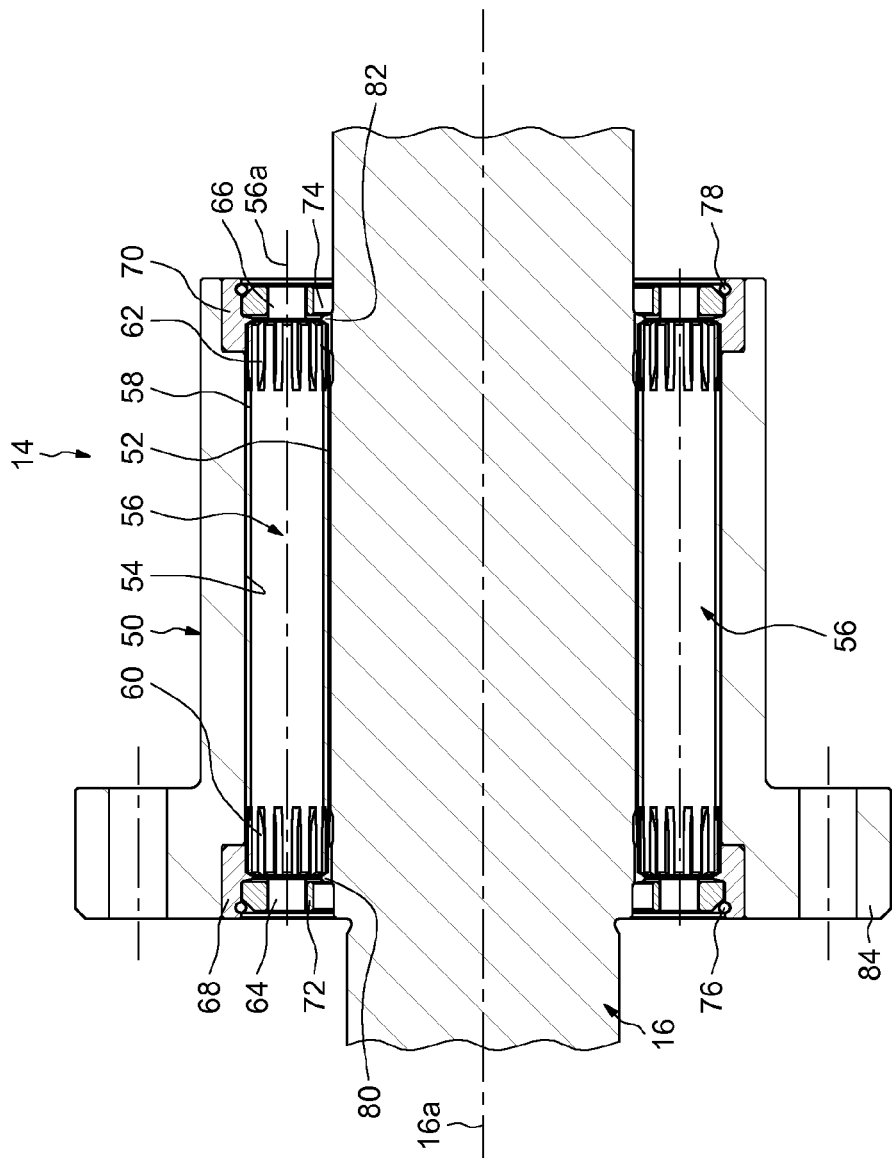

As illustrated more clearly in FIG. 3, the rollers 56 are identical to each other and distributed in a regular manner around the screw 16. Each roller 56 extends along an axis 56a which is coaxial with the axis 16a of the screw and comprises an outer thread 58 which is in engagement with the second threaded portion 52 of the screw and the thread 54 of the bushing. The threaded portion 52 of the screw, the thread 54 of the bushing and the thread 58 of the rollers each comprise an inlet. The thread 58 of each roller is axially extended at each end by a tooth arrangement 60, 62 which is itself extended axially by a cylindrical journal 64, 66 which extends axially outwards.

The thrust bearing 14 also comprises two annular gear wheels 68, 70 which are fixed to a non-threaded portion of the bore of the bushing 50 and which each comprise at the inner side a tooth arrangement (not designated) which is in engagement with the tooth arrangement 60, 62 of the rollers, respectively, for their synchronization. The thrust bearing 14 further comprises two annular rings 72, 74 which are each mounted radially between the screw and the associated gear wheel 68, 70 and which comprise a plurality of cylindrical through-recesses (not designated) which are distributed in a regular manner in the circumferential direction and inside which the journals 64, 66 of the rollers are accommodated. The rings 72, 74 allow the rollers 56 to be carried and allow their regular circumferential spacing to be maintained. The mechanism 10 further comprises snap rings 76, 78 which are each mounted in a groove provided in the bore of the associated gear wheel 68, 70 and which are provided to axially retain the corresponding ring 72, 74.

The value of the helix angle of the threads 58 of the rollers is identical to the value of the helix angle of the thread 54 of the nut and the value of the helix angle of the second threaded portion 52 of the screw such that, when the screw 16 rotates relative to the bushing 50, the rollers 56 rotate about themselves and roll around the screw 16 without moving axially inside the bushing 50 and without moving axially relative to the screw. The rollers 56 are guided in rotation parallel with the axis 16a of the screw by the tooth arrangements of the gear wheels 68, 70 and by the tooth arrangements of the gear wheels 80, 82.

During the rotation of the screw 16, the rollers 56 rotate about themselves without converting the rotation movement of the screw into a linear displacement of the bushing 50 along the axis 16a of the screw. The rollers 56 are fixed axially both relative to the screw 16 and relative to the bushing 50. There is no relative axial displacement between the screw 16, the rollers 56 and the bushing 50.

The thrust bearing 14 has only the function of guiding the rotation movement of the screw 16 and supporting the loads transmitted to the system 10. The thrust bearing 14 forms an axial thrust bearing with zero pitch. The bushing 50 comprises a fixing collar 84 which is provided on its outer surface and which comprises a plurality of through-holes in order to be able, for example, to fix the bushing to a fixed support.

Advantageously, the contact profiles of the roller thrust bearing 14 are identical to the contact profiles of the roller screw mechanism 12. The static and dynamic capacities of the thrust bearing 14 are therefore similar to those of the mechanism 12 for the same spatial requirement. The function of guiding and absorbing the forces produced by the thrust bearing 14 is integrated on the mechanism screw 12 with a small spatial requirement. The value of the opening angle of the flanks of the thread of the second outer portion 52 of the screw is equal to the value of the opening angle of the flanks of the thread of the bushing 50 of the thrust bearing, to the value of the opening angle of the flanks of the thread of the first portion 18 of the screw and to the value of the opening angle of the flanks of the thread of the nut 20 of the mechanism. By way of illustration, the values may be equal to 90 degrees. The rollers 24, 56 have in cross section a convex profile which is formed by two circle arcs which are symmetrical relative to a median radial plane perpendicular to the axis of the rollers. The profile of the rollers 24 is identical to that of the rollers 56.

In the embodiment illustrated, the first and second outer threaded portions 18, 52 of the screw form two separate threads on the screw. Alternatively, it could be possible to have on the screw a single thread which is common to the rollers 24 of the mechanism and to the rollers 56 of the thrust bearing.

The present invention has been illustrated on the basis of a system comprising a satellite roller screw mechanism combined with a satellite roller thrust bearing. In a variant, it is also possible, without departing from the scope of the invention, to provide in place of the satellite roller screw mechanism a screw mechanism with roller recirculation. In another variant, it could further be possible to combine the satellite roller screw mechanism or the screw mechanism with roller recirculation with a thrust bearing which comprises rollers which are non-threaded but provided with grooves in which the flanks of the second outer portion of the screw and the inner flanks of the bushing are accommodated. In this case, the second outer portion of the screw and the bushing do not comprise a thread but instead grooves which complement the grooves of the rollers. In a similar manner to the embodiment illustrated, such grooves provided on the second outer portion of the screw, on the bushing and on the rollers delimit flanks which are configured so that, during the rotation of the screw, there is no relative axial displacement between the screw, the rollers and the bushing of the thrust bearing.

The invention claimed is:

1. A system comprising:
a screw having an axis of rotation defining an axial direction, the screw comprising a first outer threaded portion having a first helix angle and a second outer threaded portion having a second helix angle and axially spaced from the first outer threaded portion, wherein the first helix angle is equal to the second helix angle,
a roller screw mechanism mounted on the first outer threaded portion of the screw, the roller screw mechanism having:
a nut arranged around and coaxially with the screw, the nut having a radially inner axially extending nut surface defining a nut inner thread, and
a first plurality of rollers cooperating with the first outer threaded portion of the screw and the nut inner thread of the nut, each of the first plurality of rollers having a first roller outer surface with a first roller thread therealong, the first roller thread directly engaging the first outer threaded portion of the screw and directly engaging the nut inner thread of the nut, the first roller thread and the nut inner thread each having a third helix angle that are equal to each other and different from the first helix angle of the first outer threaded portion of the screw such that upon rotation of the screw the first plurality of rollers and the nut move axially with respect to the screw, and
a roller thrust bearing mounted on the second outer threaded portion of the screw, comprising:
a bushing arranged around and coaxially with the screw, the bushing having a radially inner axially extending bushing surface defining a bushing inner thread, and
a second plurality of rollers each having a second roller outer surface defining a second roller thread therealong, the second roller thread directly engaging the second outer threaded portion of the screw and directly engaging the bushing inner thread of the bushing, the second roller thread and the bushing inner thread each having a fourth helix angle that are equal to the second helix angle of the second outer threaded portion such that upon rotation of the screw the second plurality of rollers, the bushing, and the screw are all fixed axially with respect to each other, wherein axial displacement of the roller thrust bearing is different from axial displacement of the roller screw mechanism when the screw rotates.

2. The system according to claim 1, wherein the values of the diameters of the first and second outer threaded portions of the screw are identical.

3. The system according to claim 2, wherein each of the first plurality of rollers of the roller screw mechanism further comprises grooves inside which the inner nut thread of the nut and the thread of the first outer threaded portion of the screw are accommodated, such that rotation of the screw axially displaces the roller screw mechanism while not affecting axial placement of the roller thrust bearing.

4. An actuation jack comprising:
a rotary driving means;
the system of claim 1; and
wherein the screw of the system is coupled to the rotary driving means.

5. A system comprising:
a screw having an axis of rotation defining an axial direction, the screw comprising a first outer threaded portion having a first helix angle and a second outer threaded portion having a second helix angle and axially spaced from the first outer threaded portion, wherein neither the first helix angle nor the second helix angle are perpendicular to the axis of rotation,
a roller screw mechanism mounted on the first outer threaded portion of the screw, the roller screw mechanism having:
a nut arranged around and coaxially with the screw, the nut having a radially inner axially extending nut surface defining a nut inner thread, and
a first plurality of rollers cooperating with the first outer threaded portion of the screw and the nut inner thread of the nut, each of the first plurality of rollers having a first roller outer surface with a first roller thread therealong, the first roller thread directly engaging the first outer threaded portion of the screw and directly engaging the nut inner thread of the nut, the first roller thread and the nut inner thread each having a third helix angle that are equal to each other and different from the first helix angle of the first outer threaded portion of the screw such that upon rotation of the screw the first plurality of rollers and the nut move axially with respect to the screw, and
a roller thrust bearing mounted on the second outer threaded portion of the screw, comprising:

a bushing arranged around and coaxially with the screw, the bushing having a radially inner axially extending bushing surface defining a bushing inner thread, and a second plurality of rollers each having a second roller outer surface defining a second roller thread therealong, the second roller thread directly engaging the second outer threaded portion of the screw and directly engaging the bushing inner thread of the bushing, the second roller thread and the bushing inner thread each having a fourth helix angle that are equal to the second helix angle of the second outer threaded portion such that upon rotation of the screw the second plurality of rollers, the bushing, and the screw are all fixed axially with respect to each other, wherein axial displacement of the roller thrust bearing is different from axial displacement of the roller screw mechanism when the screw rotates.

* * * * *